(12) United States Patent
Ferguson et al.

(10) Patent No.: US 7,908,362 B2
(45) Date of Patent: Mar. 15, 2011

(54) METHOD AND APPARATUS FOR THE DELIVERY OF DIGITAL DATA

(75) Inventors: David Ferguson, Cambridge (GB); Bryan Amesbury, Cambridgeshire (GB)

(73) Assignee: Velocix Ltd., Cambridge (GB)

( * ) Notice: Subject to any disclaimer, the term of this patent is extended or adjusted under 35 U.S.C. 154(b) by 524 days.

(21) Appl. No.: 11/949,297

(22) Filed: Dec. 3, 2007

(65) Prior Publication Data

US 2009/0144412 A1    Jun. 4, 2009

(51) Int. Cl.
*G06F 15/16* (2006.01)
(52) U.S. Cl. ................... 709/224; 709/227; 709/233
(58) Field of Classification Search .......... 709/200–203, 709/217–227, 232–234
See application file for complete search history.

(56) References Cited

U.S. PATENT DOCUMENTS

| | | | |
|---|---|---|---|
| 6,289,389 B1 * | 9/2001 | Kikinis ...................... | 709/239 |
| 7,475,132 B2 * | 1/2009 | Chang et al. ................. | 709/223 |
| 7,512,697 B2 * | 3/2009 | Lassen et al. ................ | 709/230 |
| 2002/0129123 A1 * | 9/2002 | Johnson et al. ............... | 709/219 |
| 2003/0028626 A1 | 2/2003 | Hennessey et al. | |
| 2003/0204602 A1 | 10/2003 | Hudson et al. | |
| 2004/0148344 A1 | 7/2004 | Navar | |
| 2004/0172476 A1 | 9/2004 | Chapweske | |
| 2006/0031537 A1 | 2/2006 | Boutboul et al. | |
| 2007/0006270 A1 | 1/2007 | Frigui et al. | |
| 2008/0037438 A1 | 2/2008 | Twiss | |
| 2008/0040482 A1 | 2/2008 | Twiss | |

FOREIGN PATENT DOCUMENTS

| | | |
|---|---|---|
| GB | 2 440 774 A1 | 2/2008 |
| WO | 01/91417 A2 | 11/2001 |
| WO | WO 01/88811 A2 | 11/2001 |
| WO | PCT/EP2008/066675 | 12/2009 |

OTHER PUBLICATIONS

D. Xu et al., "Analysis of a CDN-P2P Hybrid Architecture for Cost-Effective Streaming Media Distribution," Multimedia Systems, Apr. 2006, pp. 383-399.

(Continued)

*Primary Examiner* — Moustafa M Meky
(74) *Attorney, Agent, or Firm* — Ryan, Mason & Lewis, LLP

(57) ABSTRACT

A method and apparatus for the delivery of digital data to an end user (902) from a network (900) comprising at least two different data sources (912a, 912b) is disclosed. Each of the at least two different data sources (912a, 912b) can deliver the digital data to the end network at at least one parameter and the data sources (912a, 912b) have substantially identical copies of the digital data comprising portions and are connected to the end user (902). The method comprises receiving (1011) a list of a subset of the at least two data sources (912a, 912b) and selecting (1012) on the basis of the list one or more of the subset of at least two data sources (912a, 912b). At least a portion of the digital data from the selected ones of the at least two data sources (912a, 912b) is delivered to the end user (902). The parameter for the delivery of the digital data to the end user (902) is monitored and the configuration (913) of the selected ones of the at least two data sources (912a, 912b) is adjusted (1015) on the basis of the monitored parameter such that a combined configuration of the configurations (913) of the selected ones of the at least two data sources (912a, 912b) matches the specification (905).

23 Claims, 13 Drawing Sheets

OTHER PUBLICATIONS

Anup Basu et al., "Multi-server Optimal Bandwidth Monitoring for QoS based Multimedia Delivery", IEEE, 2003, p. 812-815.

Anup Basu et al., "Distributed Retrieval of Wavelet Images Using Bandwidth Monitoring", IEEE, 2002, p. 604-607.

Shaleeza Sohail et al., "QoS Driven Parallelization of Resources to Reduce File Download Delay", IEEE Transactions on Parallel and Distributed Systems, vol. 17, No. 10, Oct. 2006, p. 1204-1215.

* cited by examiner

METHOD AND APPARATUS FOR THE DELIVERY OF DIGITAL DATA

FIELD OF THE INVENTION

The present invention relates to a method and network for the supply of digital data from multiple data sources, in particular in a peer-to-peer network, and a spot market for the supply of the digital data.

BACKGROUND OF THE INVENTION

In the current Internet system, an Internet Service Provider (ISP) provides Internet connections to customers or subscribers. The ISP is connected to other ISPs by backbones which are generally operated by other companies. In order to connect to the Internet, the ISP will buy bandwidth on one of the Internet backbones which distributes data between various ones of the ISPs and also between data sources. An ISP in Singapore will, for example, buy bandwidth on trans-pacific cables between Singapore and the United States and on cables between Europe and Australia and Singapore. The bandwidth purchased is symmetric. However, many ISPs in the Asia-Pacific Region for example, are net downloaders of bandwidth as the end users of the digital data—i.e. customers of an ISP from those regions—are more active "consumers" of data produced outside of their region than they are providers of data to the Internet. It is also possible for an ISP to also be stakeholder in a backbone system.

Thus the ISP in the Asia-Pacific region is a net downloader of data from the Internet. However, the ISP has purchased symmetric capacity on the Internet backbones. The capacity purchased is sufficient to accommodate the required download rates for data requested by the ISP customers. However, there is substantial overcapacity for uploading data from the ISP to the Internet. As a result, uploading of data from the Asia-Pacific ISP to the rest of the Internet will require little additional costs. Much of the hardware, such as switches, is symmetric and therefore to upload data to the network there would be little increase in installed costs.

A Content Delivery Network (CDN) is a system of computers networked together across the Internet that cooperate to deliver digital data in the form of content (such as large media content including videos and audio files) to end users. Examples of such content based CDN's include Sandpiper and Skycache as well as Akamai and Digital Island and the Applicant's own VelociX network. The Akamai CDN, for example, supplies many connections to many users from a single source.

The CDN has one or more servers on which content is stored. These CDN servers are generally deployed in multiple locations and can often be reached from an ISP over multiple backbones. These CDN servers will cooperate with each other to satisfy requests for content by end users, such as the ISP customers. In prior art systems, the CDN servers will move content behind the scenes to optimize the delivery process of the digital data to the end user. The optimization of the delivery process can take the form of reducing bandwidth costs and/or improving end-user performance.

The number of CDN servers in the CDN varies and depends on the architecture of the CDN. Some of the CDN's have thousands of nodes with tens of thousands of servers. When a user wishes to download content, generally requests for content (digital data) are sent to the CDN from an end user. These content requests are directed to the one of the CDN servers which can provide the best service. When optimizing for service, the CDN servers located in the geographical locations that can serve the requested content most quickly to the end user will generally be chosen to serve the content request. This choice of CDN server may be governed by the principle of choosing the geographical locations that are the fewest hops or fewest number of network seconds away from the end user requesting the digital data (termed the requestor). Alternatively the CDN known in the prior art will chose the CDN server so as to optimize the delivery of the digital data across local networks. When optimizing for cost, CDN servers located in the geographical locations that are less expensive to serve from may be chosen to serve the content request. Often these two goals tend to align, as those CDN servers that are close to the end user have in the prior art systems an advantage in serving costs because they are located within the same network as the end user.

Co-Pending UK Patent Application No GB061596.3 (& U.S. patent application Ser. No. 11/598,115) discloses a content distribution network in which a data monitoring device at a server monitors at least one quality of service (QoS) parameter for the delivery of digital data. The patent application discloses that one of the QoS parameters may be the cost of delivery of the digital data.

Co-Pending UK Patent Application NO GB0615962.8 [(& U.S. patent application Ser. No. 11/598,114) assigned to CacheLogic Ltd, Cambridge, UK teaches a content distribution network in which the selection of the cache from which to download the digital data is obtained is based, at least in part, on the location of the user selecting the digital data.

U.S. patent application No US 2004/0148344 assigned to Serenade Systems, Mountain View, Calif., USA, shows a content distribution network using the Internet. The Serenade system shows a peer-to-peer network in which peer groups are associated and maintained for efficient file distribution. Caches in this application are prioritised based on availability and cost. The network may be configured such that any peer which is not exploiting its available or maximum desired serving bandwidth begins pushing out content to the peer-to-peer network. As mentioned above, CacheLogic Ltd, Cambridge, UK currently offers a VelociX video delivery system which allows a client wishing to deliver digital data, such as a video, to do so at an assigned delivery speed and/or at a fixed cost. This allows, for example, end users paying a premium price for the receipt of the video to receive it within a guaranteed timeframe, rather than waiting for the arrival of the complete digital data to be dependent on network conditions. The VelociX video delivery system is disclosed at http://www.cachelogic.com/home/pages/video/index.php [downloaded 16 Jun. 2007]

Efforts in the past for creating a market-based resource allocation system for the provision of network bandwidth capacity for the distribution of digital data are known. For example, international patent application No WO 01/88811 assigned to Invisible Hand Networks teaches the creation of a spot-market system for the purchase of bandwidth and/or buffer space.

SUMMARY OF THE INVENTION

The invention provides a method for the delivery of digital data to an end user from a network comprising at least two different data sources which have at least one parameter associated with them. The at least two data sources have substantially identical copies of the digital data comprising portions and are connected to the end user. The method comprises receiving at least one list of a subset of the at least two data sources with the associated parameter and selecting on the basis of the list one or more of the subset of the at least two data sources such that a configuration of the selected ones of the at least two data sources matches a specification for the delivery of the digital data to the end user. At least a portion of the digital data is delivered from the selected ones of the at least two data sources to the end user. The parameter for the delivery of the digital data to the end user is monitored and the configuration of the selected ones of the at least two data sources is adjusted on the basis of the monitored parameter such that a combined configuration of the configurations of the selected ones of the at least two data sources matches the specification.

The invention allows the selection of the data sources for the supply of the digital data to the end user within the network to be optimized. The selection of the data sources is optimized in the sense that the data sources for the delivery of the digital data are dynamically selected such that during the delivery of the digital data a contracted bandwidth on a network path from a cache to the end user can be met at the least possible cost or congestion. It is immaterial within the network where the data source is located with respect to the end user as long as the selection of the data source together with other previously selected data sources helps to ensure that the contracted bandwidth to the end user from the data sources is met, for example, at the least cost or with the required rate of delivery.

The invention further allows basing the selection of the data sources on either or both the cost of delivery as well as the target rate of delivery from the data source to the end user. It is therefore possible to combine quality of service (rate of delivery in this case) with distributing the usage of the data sources, as underused ones of the data sources tend to provide the digital data at a lower parameter (cost of delivery).

According to one aspect, the invention further allows the optimal selection of bandwidth within the network by having the data sources decide independently how to deliver the portions of the digital data to the end user. There is hence no central controller so that end user's privacy concerns can be satisfactorily addressed.

The invention provides further for an apparatus for the delivery of digital data to an end user in which the digital data comprises a plurality of portions. The apparatus of the invention comprises a network of at least two data sources which supply portions of the digital data at a parameter to the end user. At least two different data sources are connected to the end user and a tracker provides a list of the at least two data sources. The apparatus further includes a selection device for selecting on the basis of the list one or more of the two data sources to supply at least some of the portions of the digital data to the end user such that a configuration of the selected ones of the at least two data sources matches a specification for the delivery of the digital data to the end user. A monitoring device for monitoring the parameter for the delivery of the digital data to the end user is included in the apparatus together with an adjusting device for adjusting on the basis of the monitored parameter the configuration of at least one of the selected ones of the at least two data sources such that a combined configuration of the configurations of the selected ones of the at least two data sources matches the specification.

In another aspect of the invention the method for the selection of a data source for delivery of digital data from the data source to an end user comprises receiving proposals for the delivery of the digital data to the end user from at least two data sources which are connected in a network. The proposals offer at a parameter bandwidth on connections from the at least two data sources to an end user for the delivery of the digital data. The parameter is, for example, the cost of delivery or the rate of delivery of the digital data.

The invention further includes, in a further aspect, an apparatus for the selection of a data source for the delivery of digital data from the data source which comprises a receiving device for receiving proposals on connections to an end user from at least two data sources connected in a network and offering bandwidth on the network paths at a parameter for the delivery of the digital data. A selection device selects the proposals on the basis of the parameter from the at least two data sources and selects the data sources corresponding to the selected one of the proposals such that a configuration of the selected data sources matches a specification for the delivery of the digital data to the end user.

DETAILED DESCRIPTION OF THE INVENTION

Figure 1:
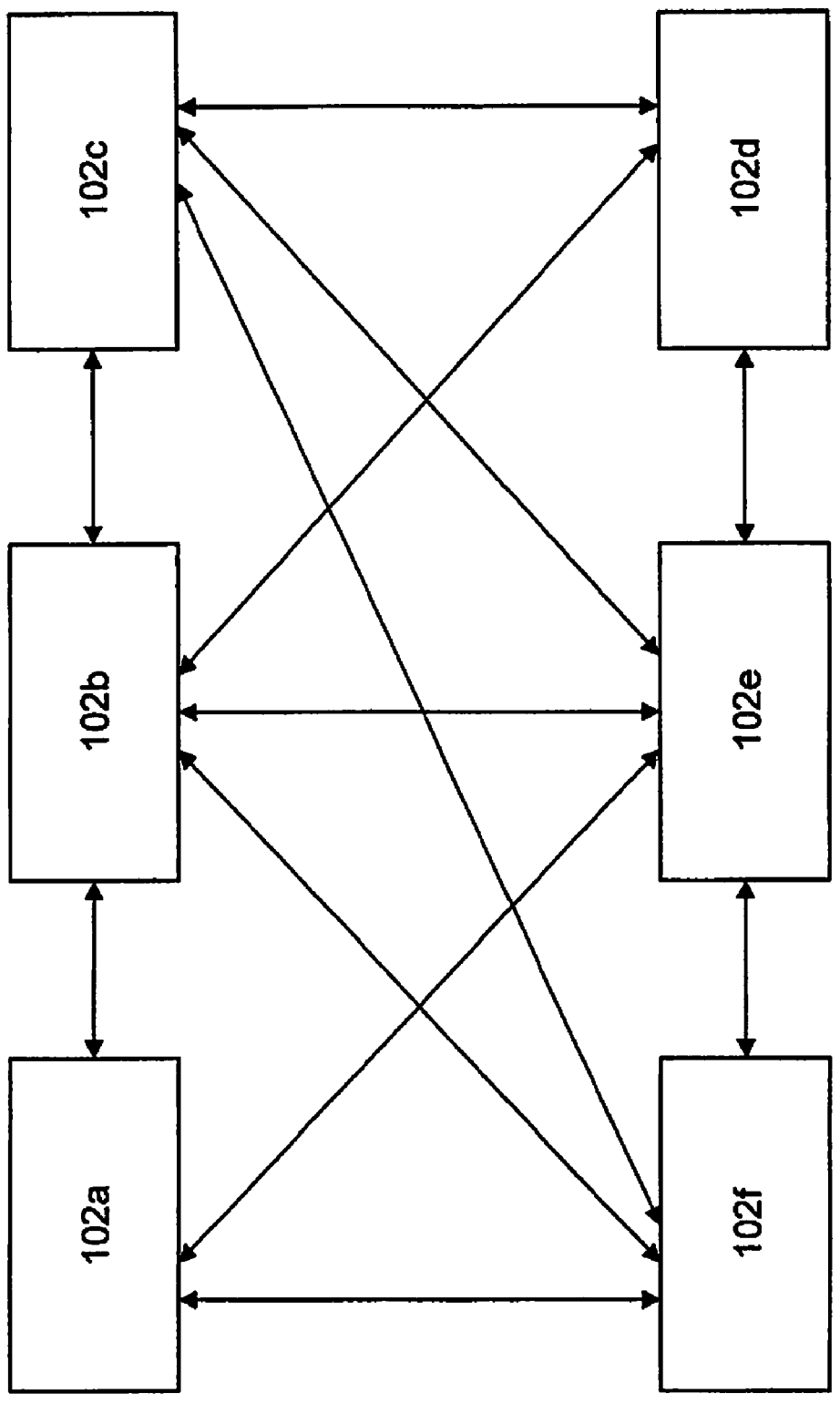
FIG. 1 shows a Peer-to Peer network as known in the art.

A peer-to-peer (also termed P2P) computer network is a network that relies primarily on the computing power and bandwidth of the participants in the computer network rather than concentrating computing power and bandwidth in a relatively low number of servers. P2P computer networks are typically used for connecting nodes of the computer network via largely ad hoc connections. The P2P computer network is useful for many purposes. Sharing content files containing, for example, audio, video and data is very common. Real time data, such as telephony traffic, is also passed using the P2P network.

A pure P2P network does not have the notion of clients or servers, but only equal peer nodes that simultaneously function as both "clients" and "servers" to the other nodes on the network. This model of network arrangement differs from the client-server model in which communication is usually to and from a central server. A typical example for a non P2P file transfer is an FTP server where the client and server programs are quite distinct. In the FTP server clients initiate the download/uploads and the servers react to and satisfy these requests from the clients.

Some networks and channels, such as Napster, OpenNAP, or IRC @find, use a client-server structure for some tasks (e.g., searching) and a P2P structure for other tasks. Networks such as Gnutella or Freenet use the P2P structure for all purposes, and are sometimes referred to as true P2P networks, although Gnutella is greatly facilitated by directory servers that inform peers of the network addresses of other peers.

One of the most popular file distribution programmes used in P2P networks is currently BitTorrent which was created by Bram Cohen. BitTorrent is designed to distribute large amounts of data widely without incurring the corresponding consumption in costly server and bandwidth resources. To share a file or group of files through BitTorrent, clients first create a "torrent file". This is a small file which contains meta-information about the files to be shared and about the host computer (the "tracker") that coordinates the file distribution. Torrent files contain an "announce" section, which specifies the URL of a tracker, and an "info" section which contains (suggested) names for the files, their lengths, the piece length used, and a SHA-1 hash code for each piece, which clients should use to verify the integrity of the data they receive.

The tracker is a server that keeps track of which seeds (i.e. a node with the complete file or group of files) and peers (i.e. nodes that do not yet have the complete file or group of files) are in a swarm (the expression for all of the seeds and peers involved in the distribution of a single file or group of files). Nodes report information to the tracker periodically and from time-to-time request and receive information about other nodes to which they can connect. The tracker is not directly involved in the data transfer and is not required to have a copy of the file. Nodes that have finished downloading the file may also choose to act as seeds, i.e. the node provides a complete copy of the file. After the torrent file is created, a link to the torrent file is placed on a website or elsewhere, and it is normally registered with the tracker. BitTorrent trackers maintain lists of the nodes currently participating in each torrent. The computer with the initial copy of the file is referred to as the initial seeder.

Using a web browser, users navigate to a site listing the torrent, download the torrent, and open the torrent in a BitTorrent client stored on their local machines. After opening the torrent, the BitTorrent client connects to the tracker, which provides the BitTorrent client with a list of clients currently downloading the file or files.

Initially, there may be no other peers in the swarm, in which case the client connects directly to the initial seeder and begins to request pieces. The BitTorrent protocol breaks down files into a number of much smaller pieces, typically a quarter of a megabyte (256 KB) in size. Larger file sizes typically have larger pieces. For example, a 4.37 GB file may have a piece size of 4 MB (4096 KB). The pieces are checked as they are received by the BitTorrent client using a hash algorithm to ensure that they are error free.

In the standard BitTorrent protocol, there is no information about delivery speed from any one of the peers. The BitTorrent client will give peers in the swarm four sources for the pieces of the file. It will provide the peers with details of three best seeds and at least one random seed. The reason for this is that the BitTorrent client is trying to maximise its own amount of data, as will be further explained below.

As further peers enter the swarm, all of the peers begin sharing pieces with one another, instead of downloading directly from the initial seeder. Clients incorporate mechanisms to optimize their download and upload rates. Peers may download pieces in a random order and may prefer to download the pieces that are rarest amongst it peers, to increase the opportunity to exchange data. Exchange of data is only possible if two peers have a different subset of the file. It is known, for example, in the BitTorrent protocol that a peer initially joining the swarm will send to other members of the swarm a BitField message which indicates an initial set of pieces of the digital data which the peer has available for download by other ones of the peers. On receipt of further ones of the pieces, the peer will send a Have message to the other peers to indicate that the further ones of the pieces are available for download.

FIG. 1 is a block diagram illustrating an environment in which various embodiments of the invention may be practiced. FIG. 1 includes a Peer-to-Peer (P2P) network 100. The P2P network 100 includes a plurality of peers, such as peer 102a, 102b, 102c, 102d, 102e and 102f, hereinafter referred to as peers 102, connected to each other. P2P network 100 may be a Local Area Network (LAN), a Wide Area Network (WAN), a Metropolitan Area Network (MAN), a wireless network and the like. The peers 102 present in the P2P network 100 include stored digital data. Various examples of the digital data include, but are not limited to, an application file, a video file, a music file and the like. In P2P network 100 the digital data is shared among the peers 102. It should be understood that the peers 102 may store multiple copies of the digital data.

Figure 2:
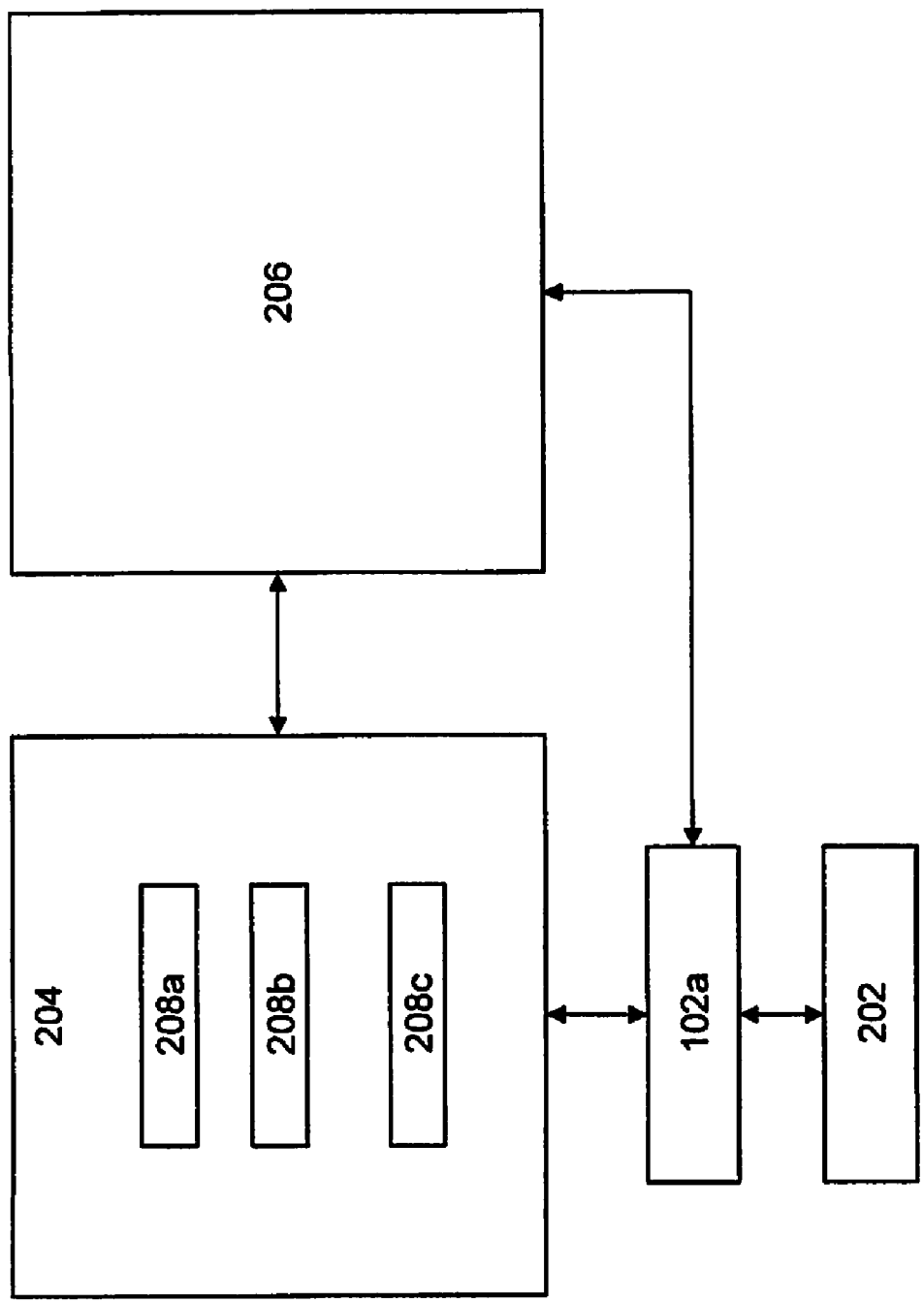
FIG. 2 shows the request for a download of a digital data.

FIG. 2 is a block diagram illustrating a user 202 sending a request for download of a digital data through peer 102a, in accordance with an embodiment of the invention. FIG. 2 includes the peer 102a, the user 202, a server 204 and a tracker server 206. In an embodiment of the present invention, the server 204 includes one or more torrent files, such as torrent file 208a, 208b and 208c, hereinafter referred to as the torrent files 208. The present invention has been described with respect to BitTorrent protocol as an exemplary embodiment. It should be understood by those skilled in the art that present invention is applicable to all P2P protocols.

The user 202 makes a request at the peer 102a to download the digital data. The peer 102a communicates with the server 204 and provides information for the digital data to be downloaded to the server 204. Subsequently, the server 204 locates one of the torrent files related to the digital data requested for download by peer 102a, such as, for example, torrent file 208a. In various embodiments of the invention torrent files 208 includes information related to the name, size, number of pieces and check sum error for the digital data to be downloaded by peer 102a.

Subsequently, in various embodiments of the present invention, the tracker server 206 provides a list of peers 102 present in the P2P network 100 with the pieces of the digital data to be downloaded The peer 102a, thereafter, communicates with the available list of peers 102 for downloading the related digital data. The peer 102a communicates with peers 102 by sending a bitfield of the pieces of the digital data that peer 102a has. After peer 102a receives all the bitfields from peers 102, it sends a message to the peers 102 where it finds relevant data and starts downloading the pieces of the requested digital data.

Figure 3:
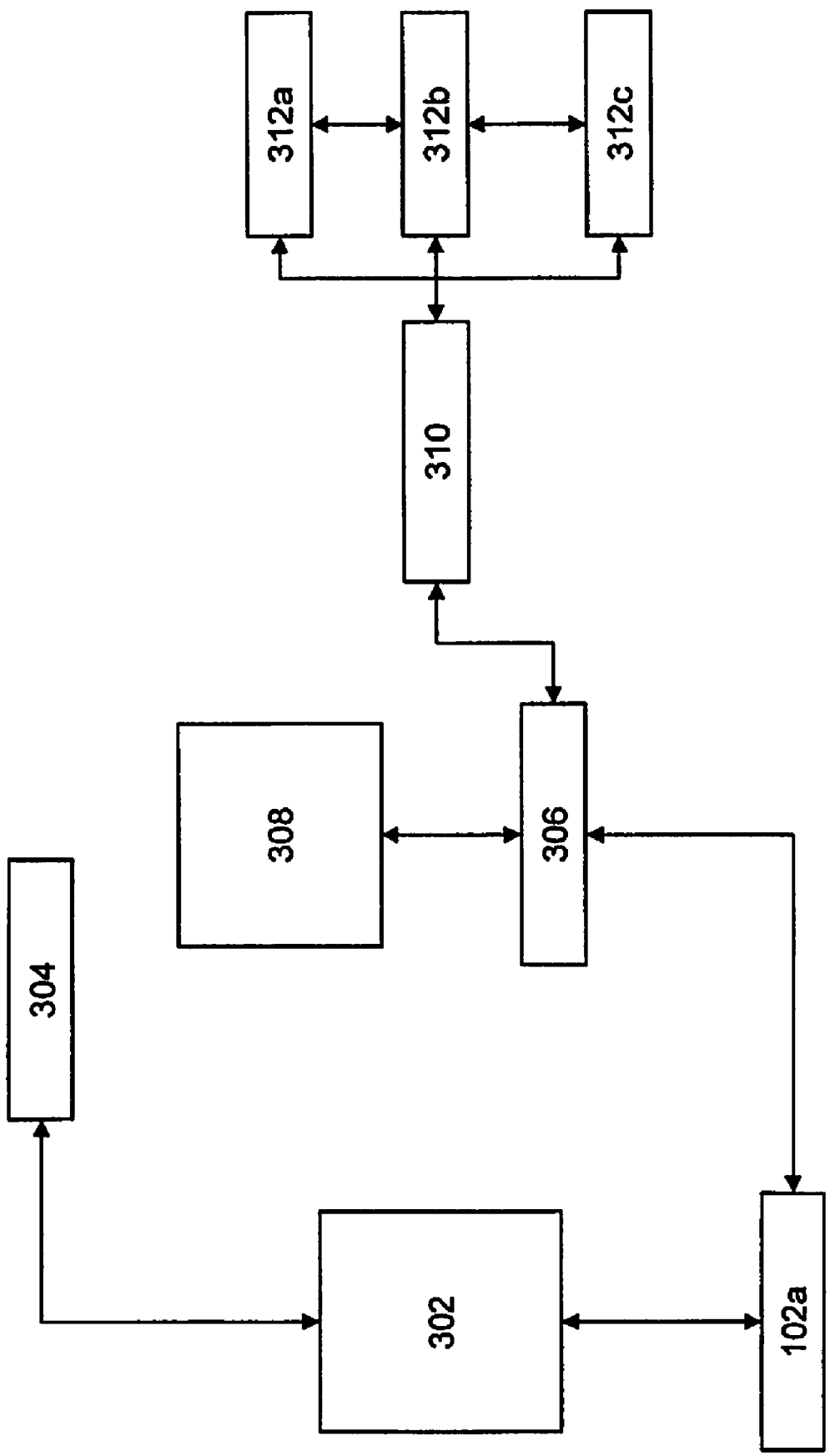
FIG. 3 shows an overview of the network in accordance with the invention.

FIG. 3 is a block diagram illustrating peer 102a in communication with a Cache Location Server (CLS) 302, in accordance with an embodiment of the present invention. FIG. 3 includes the peer 102a, the CLS 302, a database 304, an Internet Service Provider Domain Name Server (ISP DNS) 306, a central Domain Name Server (central DNS) 308, a cache DNS 310 and one or more caches, such as, cache 312a, 312b and 312c, hereinafter referred to as caches 312.

The peer 102a communicates with the CLS 302. In an embodiment of the present invention, the information sent by the peer 102a to the CLS 302 may also contain the IP address of the peer 102a. Based on the received information, the CLS 302 communicates a location string to the peer 102a. In an embodiment of the present invention, the CLS 302 may get the location string from the database 304. The database 304 stores information about the IP address ranges of countries, ISPs, regions, towns, etc for the purpose of generating specific location strings with respect to peers 102.

The peer 102a then, using the location string and information from the Torrent File 208, makes communication with the ISP DNS 306.

In various embodiments of the present invention, the information sent by peer 102a to ISP DNS 306 may be as following:

Protocol-TruncatedHash.Protocol-Publisher-Location-String.Find-Cache.com

An example of the information sent by CLS 302 to peer 102a may be as following:

bt-1234.bt-bigcorp-bigispnyc.find-cache.com where, 'bt' represents the BitTorrent protocol used by the peer 102a, '1234' representing a specific hash value associated with the digital data to be downloaded by the peer 102a, 'bigcorp' representing the publisher (a fictional "Big Corporation") of the digital data to be downloaded, 'bigispnyc' representing the location string for the peer 102a (the New York point of presence for a fictional "Big ISP").

Based on this communication, the ISP DNS 306 redirects the request to the central DNS 308 (which is the name server for the domain contained in the communication). Thereafter, the central DNS 308 provides an address of the cache DNS 310 to the ISP DNS 306. The cache DNS 310, thus, receives a DNS request from the ISP DNS 306 for the digital data to be downloaded. Subsequently, the cache DNS 310 allocates one of the caches 312, such as, for example, cache 312a. In various embodiments of the present invention, the cache DNS 310 may allocate one of the caches 312 based on the load, availability and content on each of them. The cache DNS 310 communicates this information to the ISP DNS 306, which in turn communicates the information to the peer 102a. The peer 102a, thereafter, makes a communication with the cache 312a for downloading the digital data. The communication between the peer 102a and cache 312a is explained in detail in FIG. 4.

Figure 4:
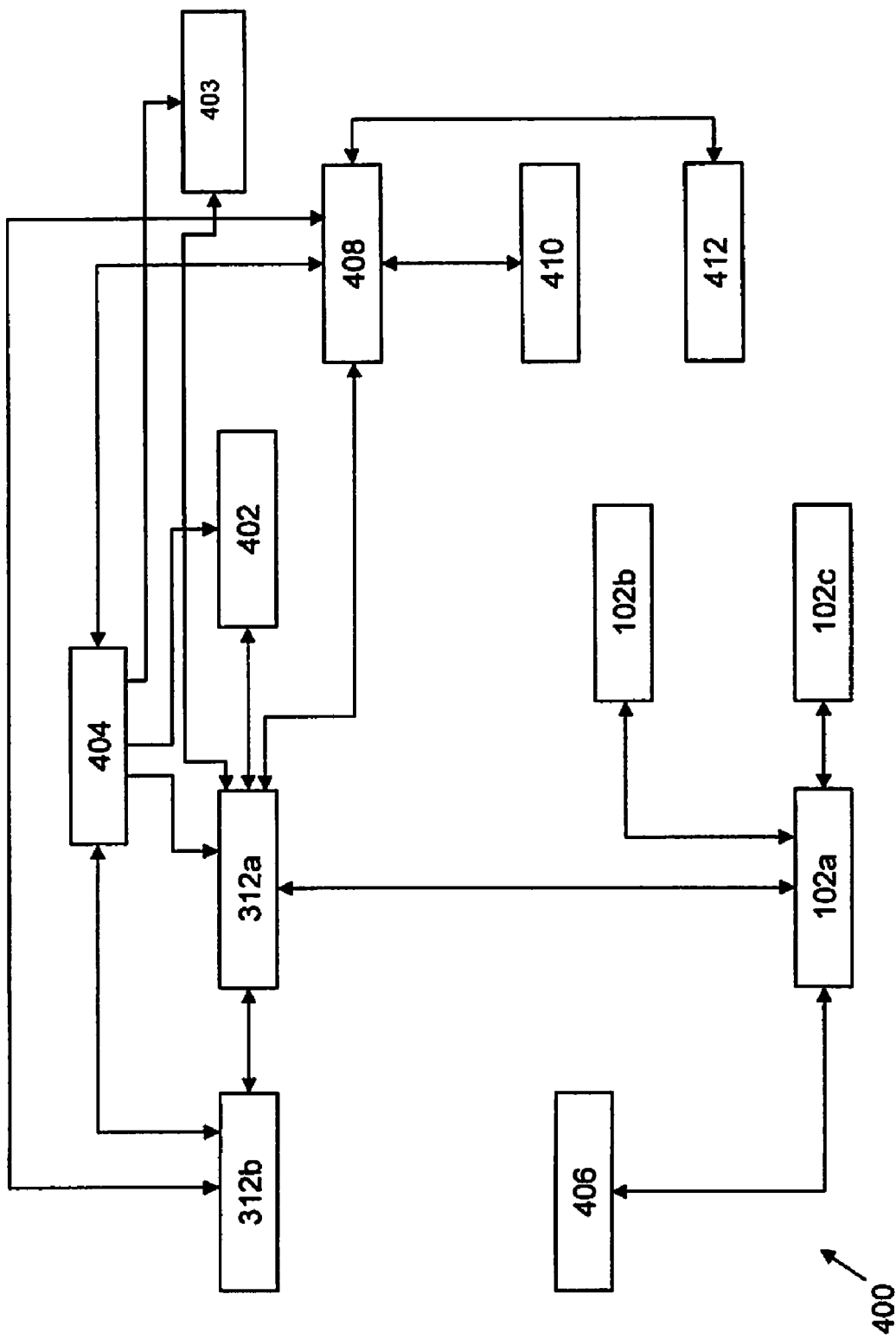
FIG. 4 shows an overview for the distribution of content.

FIG. 4 is a block diagram illustrating a system 400 for content distribution in the P2P network 100. The system 400 includes the peer 102a, 102b and 102c, the cache 312a and 312b, a first content server 402, a second content server 403, a private tracker 404, a public tracker 406, a business logic unit 408, a central database server 410 and a user interface unit 412.

The peer 102a sends a request to the cache 312a for downloading the digital data. The cache 312a is connected to the first content server 402 and/or the second content server 403 and the private tracker 404. In various embodiments of the present invention, the first content server 402 and the second content server 403 both include complete copies of a plurality of stored digital data in the P2P network 100. According to one aspect of the present invention, the first content server 402 and/or the second content server 403 is/are connected to a publisher's computer network. Both the content server 402 and the second content server 403 receive the digital data, which are to be distributed, from the publisher's computer network. For example, the publisher wishing to distribute a video file in the P2P network 100 would first upload the video file to the first content server 402 or the second content server 403. Thereafter, the video file can be subsequently downloaded by the peers 102 from the first content server 402 or the second content server 403.

According to one aspect of the present invention, as soon as the publisher uploads a piece of the digital data on the first content server 402 or the second content server 403, the digital data becomes available for the peers 102 to be downloaded. Thus, as the publisher progresses with the upload of subsequent pieces of the digital data, the peers 102 are able to download those uploaded pieces in parallel. Therefore, the capability of the system 400 to execute parallel uploads and downloads of the digital data from the first content server 402 or the second content server 403 ensures an efficient real time availability of digital data in the P2P network 100.

The cache 312a downloads the digital data, based on the request from the peer 102a, from the first content server 402 or the second content server 403 or from cache 312b. The private tracker 404 knows which of the digital data are available on which of the caches 312 and first content servers 402 and the second content server 403 and provides this information to the cache 312a. If the digital data requested by the peer 102a is available on the cache 312a, the peer 102a downloads the digital data from the cache 312a. If the digital data is not available on the cache 312a, the cache 312a downloads the requested digital data from the first content server 402 and/or the second content server 403 and/or the cache 312b. Thereafter, the cache 312a makes the digital data available to the peer 102a for downloading. According to one aspect of the present invention, the peer 102a may also download the related digital data from the other peers 102 available in the P2P network 100, such as, for example, peer 102b and peer 102c.

According to another aspect of the present invention, the cache 312a may upload digital data from the peers 102 available in the P2P network 100. In such a case, the cache 312a acts as one of the peers 102.

As discussed above, the private tracker 404 maintains a track of all the data available on the first content server 402 and the second content server 403 and the caches 312. The public tracker 406 is connected to all of the caches 312 and to all of the peers 102 in the P2P network 100. The public tracker 406 maintains a track of all the data digital data transferred among the caches 312 and the peers 102. In particular, the public tracker 406 maintains a list of all of the peers 102 and the caches 312 which hold copies of the digital data available in the P2P network 100.

The business logic unit 408 is connected to all the caches 312 and the private tracker 404. The business logic unit 408 authenticates peers 102 before allowing the peers 102 to upload any digital data. Further, the business logic unit 408 is connected to the central database server 410. The business logic unit 408 acts as an interface between the P2P network 100 and the central database server 410. Central database server 410 acquires log reports from the private tracker 404 and caches 312, through the business logic unit 408, for all the data transferred to and from the caches 312 and the first content server 402 and the second content server 403. Using the information from the central database server 410 obtained via the business logging unit 408, such as the log reports, the user interface unit 412 provides the required information for billing purposes and for report generation.

In an embodiment of the present invention, the central database server 410 may be connected to the public tracker 406. In another embodiment of the present invention, the public tracker 406 may be connected to the private tracker 404.

Figure 5:
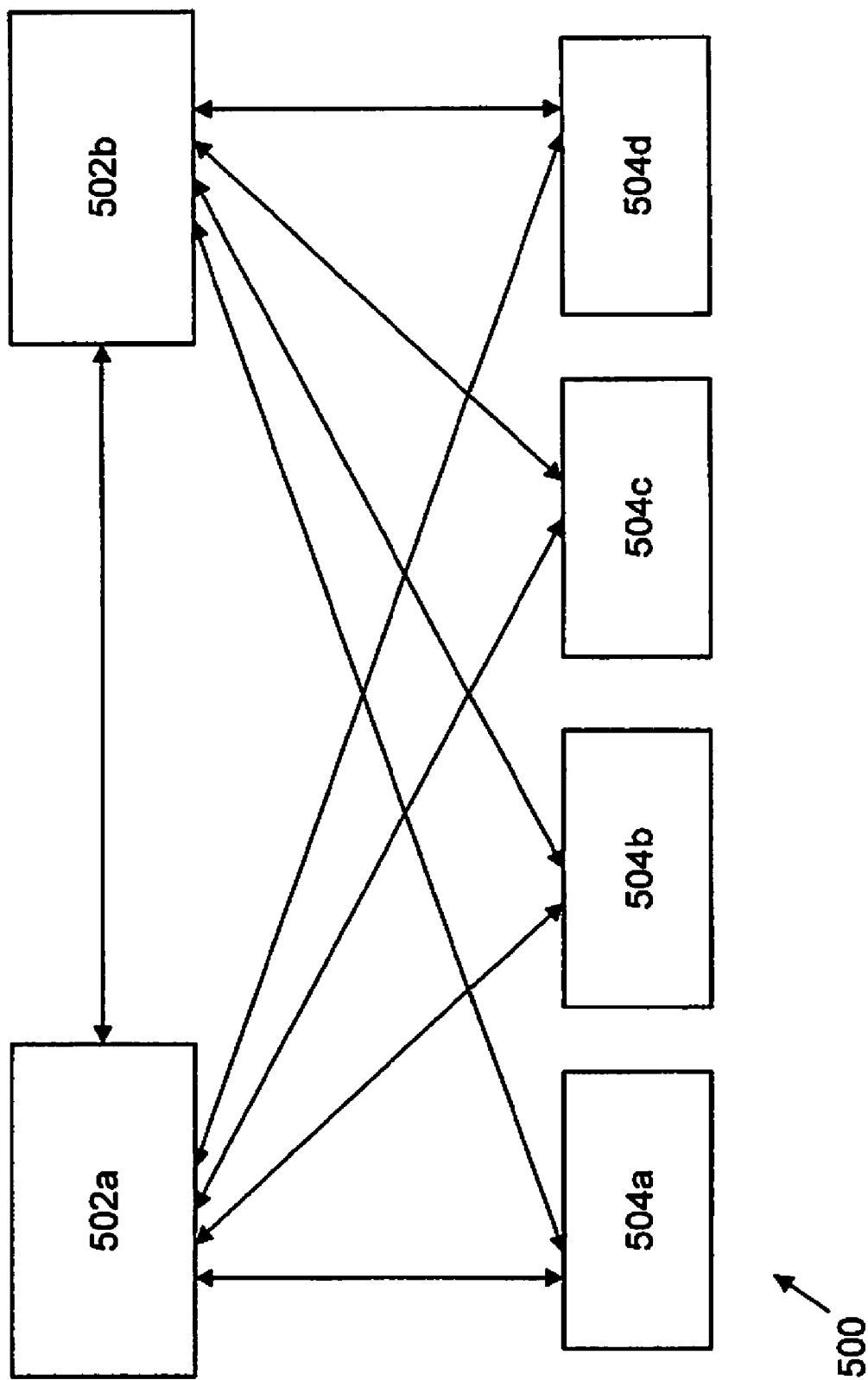
FIG. 5 shows a geographical implementation of a content distribution network

FIG. 5 is a block diagram illustrating an exemplary geographical implementation of a cache distribution network 500, in accordance with various aspects of the present invention. The cache distribution network 500 includes one or more service points of presence, such as, a service point of presence 502a and 502b, hereinafter referred to as the service points of presence (POPs) 502. The cache distribution network 500 further includes one or more data points of presence, such as, data point of presence 504a, 504b, 504c and 504d, hereinafter referred to as data points of presence (POPs) 504. The service POPs 502 are located at remote geographical locations, such as, for example London, San Jose and so forth. It should be understood by those skilled in art that the number of the service POPs 502 locations are scalable and may be increased with the increase in network traffic. The service POPs 502, such as the service POP 502a and 502b, are connected to each other. The connection between the service POPs 502 enables a real time data and information transfer between all of the service POPs 502, Furthermore, the data POPs 504 are also located in remote geographical locations across the globe, such as, for example, New York, Frankfurt and so forth. It should be understood by those skilled in art that the number of the data POPs 504 locations are scalable and may be increased with the increase in network traffic and digital data available in the P2P network 100. The data POPs 504, such as the data POP 504a and 504b, are connected with all the available service POPs 502 in the P2P network 100. The connection between the digital data POPs 504 and service POPs 502 enables a real time data update and information transfer between the data POPs 504 from the service POPs 502, In an embodiment of the present invention, a geographical location may include both, the service POP 502a and the data POP 504a.

Figure 6:
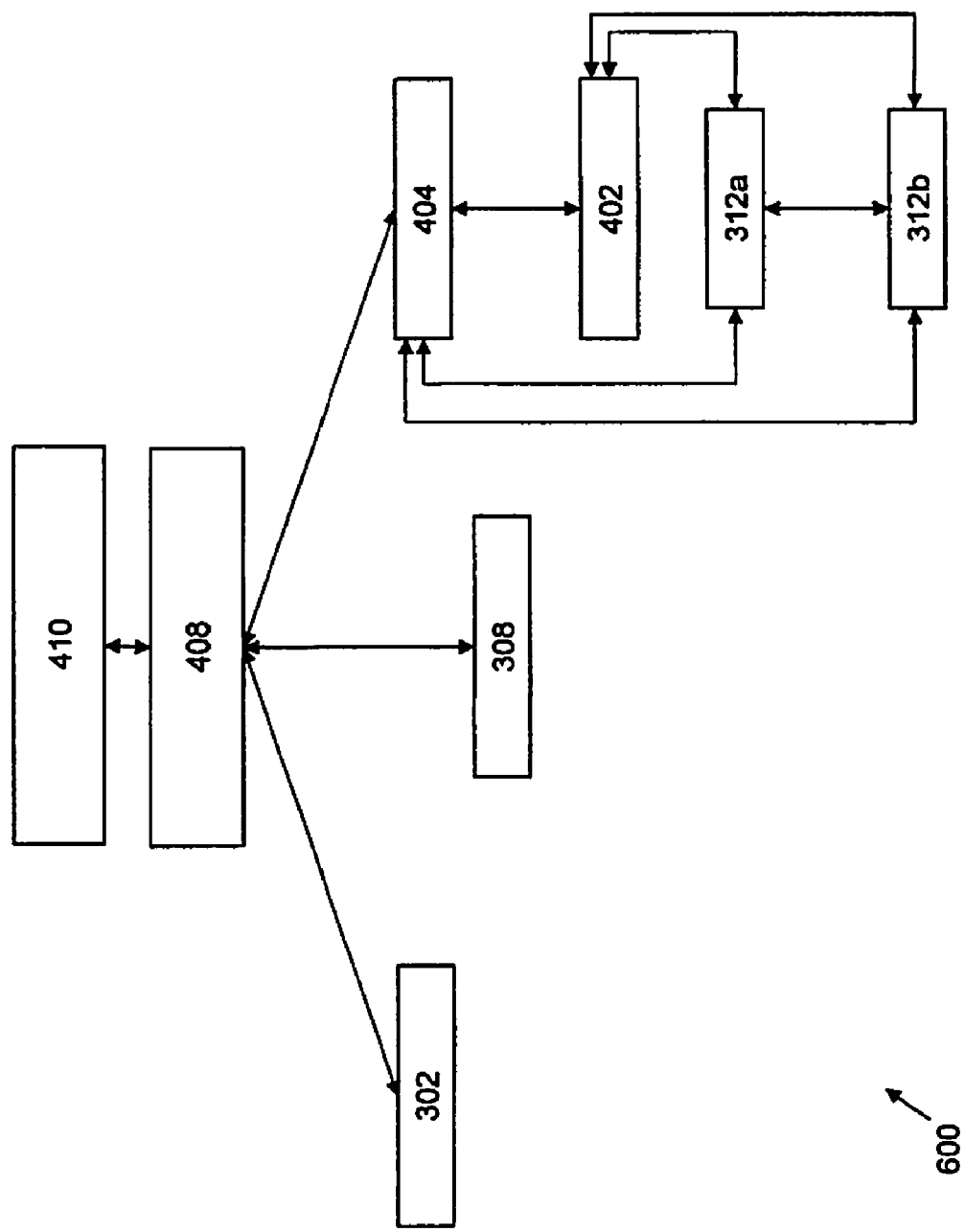
FIG. 6 shows an overview of a service point of presence.

FIG. 6 is a block diagram illustrating an arrangement 600 of the components of the service POP 502a, in accordance with an embodiment of the present invention. The arrangement 600 for the service POP 502a includes the cache location server 302, the central domain name server 308, the content or the content server 402, the private tracker 404 and the central database server 410. Further, in an embodiment of the present invention, the arrangement 600 for the service POP 502a may include the caches 312, such as, the cache 312a and 312b. Furthermore, in an embodiment of the present invention, the arrangement 600 for the service POP 502a includes the public tracker 406, the business logic unit 408 and the user interface unit 412.

In various embodiments of the invention, the central database server 410 is located in each of the service POPs 502. The central database server 410 of each of the service POPs 502 are connected to each other and act as a central database unit.

It should be understood by those skilled in the art that the components illustrated in the arrangement 600 for the service POP 502a are scalable and may be increased based on the network traffic and the digital data available in the P2P network 100.

Figure 7:
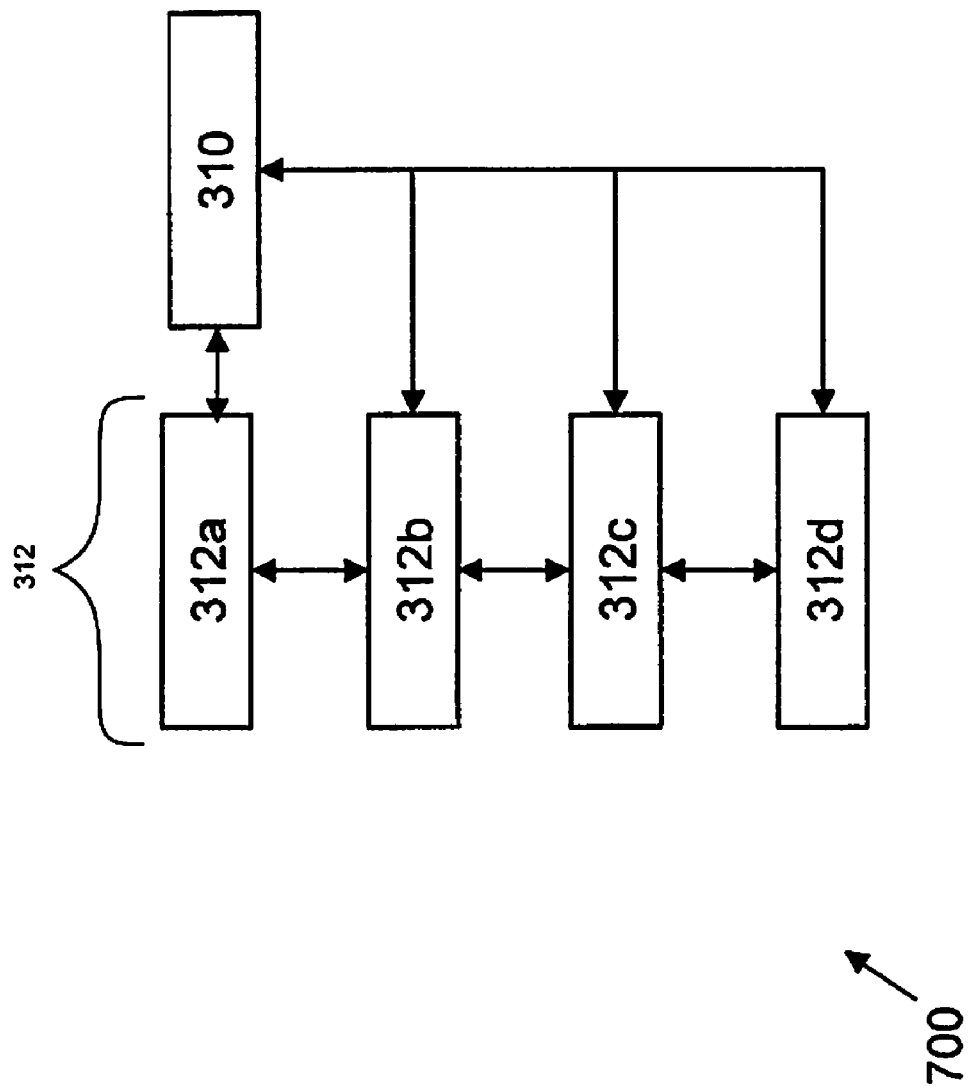
FIG. 7 shows an overview of a data point of presence.

FIG. 7 is a block diagram illustrating an arrangement 700 of the components of the data POP 504a, in accordance with an aspect of the present invention. The arrangement 700 for the data POP 504a includes the caches 312, such as, the cache 312a, 312b, 312c and 312d and the cache DNS 310. Only a single cache DNS 310 is shown in FIG. 7 for simplicity. However, the data POP 504a may contain more than one of the single caches DNS 3 10. The data POP 504a provides digital data for the peers 102 in the P2P network 100. The data POPs 504 download data from the service POPs 502.

It should be understood by those skilled in the art that the components illustrated in the arrangement 700 for the data POP 504a are scalable and may be increased based on the network traffic and the digital data available in the P2P network 100.

As discussed above in connection with FIG. 4, the peer 102a downloads from the cache 312a and from the other peers 102 available in the P2P network 100. The rates of delivery of digital data representing the pieces of the digital data vary from the multiple sources, as does the quality and the cost in providing the digital data. For example, the digital data from the peers 102 is not (necessarily) of high quality and the rate of delivery of the digital data can be—but is not necessarily—slow. On the other hand, the rates of delivery of the digital data from the caches 312 can be fairly high—particularly if the connection from the caches 312 to the peer 102a has a high bandwidth. The quality of the digital data is also high, for example the digital data does not contain many errors. However the cost of delivering the digital data from the caches 312 is higher than the cost of delivering the digital data from the peers 102.

There is a further issue with the caches 312. The cost of the connection from the peer 102a to the caches 312 is normally related to the maximum throughput provided by the caches 312. As a result, for example, during the day the caches 312 may be extremely busy but at night the caches 312 may not be so busy. The caches 312 (and the connection from the peer 102a to the caches 312) will have capacity available to the caches 312 during the night which has been paid for. The incremental cost in delivering the digital data from the caches 312 during the night is accordingly much smaller than the incremental cost in delivering the digital data from the server 312 during the day.

The rate of delivery of the digital data to the peer 102a is therefore a combination of the rates of delivery of the digital data from the other peers 102 and the caches 312. The cost for the delivery of the digital data varies according to which ones of the multiple sources (i.e. peers 102 and/or caches 312) supplies the digital data. If the digital data is supplied principally from the other peers 102 to which the peer 102a is connected, the cost of the delivery of the digital data will be small. In particular, if the other peers 102 are served by the same ISP the cost will be very small.

An unacceptable quality of service is when the peer 102a does not receive the digital data at sufficient speed or the received digital data contains too many errors. One example of an unacceptable quality of service may occur when a user 202 at the peer 102a wishes to watch a video. The video is stored as digital data in the form of video data. A certain amount of digital data has to reach the peer 102 within a fixed period of time where it is stored in a video buffer in order for the peer 102a to watch the video. If the digital data representing the pieces of the digital data is not received at sufficient rate of delivery at the peer 102a, then the user 202 will experience an interruption in the transmission of the video. This will be explained in more detail with respect to FIG. 13.

The pieces of the digital data may be downloaded from the caches 312 and the peers 102. The downloading of the digital data from the caches 312 is more costly as the bandwidth is wider, the digital data may have to pass over leased lines but the rate of the delivery of the digital data is much higher. The peer 102a can get more than enough digital data from the caches 312 to enable the user 202 to view the video and the quality of data will be high.

Figure 8:
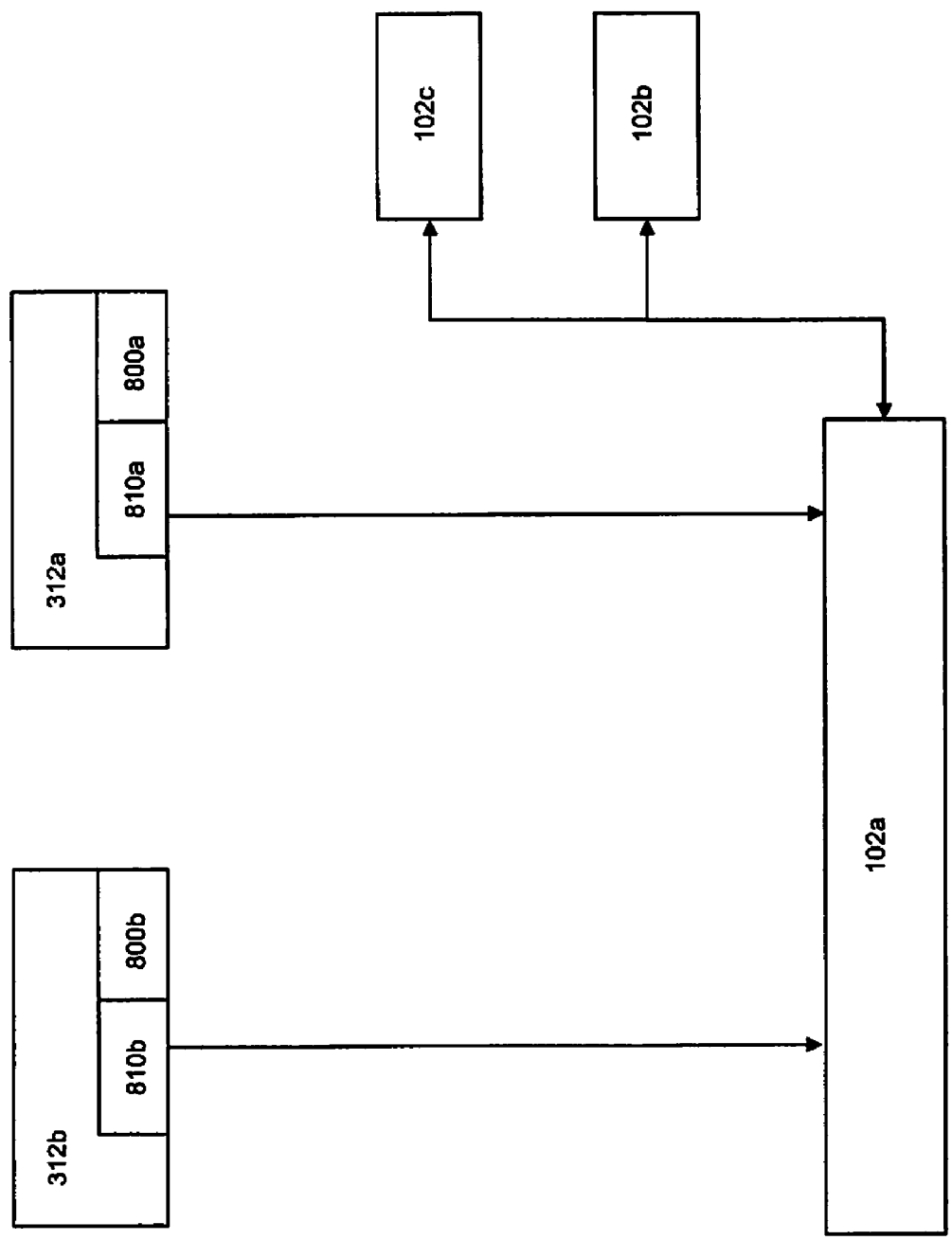
FIG. 8 shows an overview of a data delivery controller and monitor.

In order to perform this combination of the delivery of data, the caches 312 are provided with data delivery monitors 800a and 800b as shown in FIG. 8. FIG. 8 illustrates not only the data delivery monitors 800a and 800b but also two of the other peers 102b and 102c supplying the peer 102a with digital data and the caches 312a and 312b supplying the peer 102a with digital data. It will be understood that in practice the peer 102a will be connected to multiple other peers 102 and possibly to more than one cache 312.

The data delivery monitors 800 are provided with predetermined quality of service (QoS) parameters. Different ones of the digital data will have different predetermined quality of service parameters. The data delivery monitor 800 monitors the rate of delivery of the digital data from the caches 312 to the peer 102a. The monitored real-time quality of service parameters are compared with predetermined quality of service parameters. The predetermined quality of service parameters can be pre-programmed into the data delivery monitor 800 and/or may be adjusted using an application programming interface. The rate of delivery of the digital data to the peer 102a may be adjusted on the basis of the comparison as will be discussed below. It will be noted that the data delivery monitors 800 attached to each of the caches 312 operate independently of each other.

The quality of service parameters include, but are not limited to, the rate of receipt of the delivery of the digital data to the peer 102a, the cost of the delivery of the digital data and the error rate of the received digital data. For example, the pre-determined quality of service parameters could include the requirement that the digital data is received at a rate between 1 Mb and 1.2 Mb per second to allow the viewing of the video by the user 202 at the peer 102a. The pre-determined quality of service parameters might also require that the total cost for the delivery of the digital data not exceed, for example, 30c per Gigabyte.

The caches 312 preferably also include data delivery controllers 810a and 810b. The function of the data delivery controllers 810 is to receive the QoS information from the data delivery monitor 800 and to adjust the rate of delivery of the digital data from the caches 312. Each ones of the data delivery monitors 800 operates independently of other ones of the data delivery monitors 800.

The data delivery monitor 800 in one aspect of the invention monitors the receipt of the digital data by monitoring content availability messages, such as BitField and Have messages in the BitTorrent protocol which are sent by the peers 102. Equivalent techniques and messages exist in other P2P protocols.

In an aspect of the invention, the peer 102 may also select to preferentially source the digital data from underused or cheaper caches 312 as discussed above. To take an example using FIG. 5, the nearest caches 312 of the digital data for the peer 102a in Germany is, for example, located in Frankfurt. It would be from a location viewpoint optimal to use the caches 312 in Frankfurt for the delivery of the digital data. On the other hand, if the peer 102a is accessing the digital data in the morning, it is probable that the caches 312 in San Jose is underutilised because of the different time zones whilst the caches 312 in Frankfurt is operating at or close to its maximum throughput. There may be bandwidth available from the San Jose caches 312 available at minimal incremental cost. As a result, the peer 102 will attempt to receive the digital data preferentially from the San Jose caches 312 in order to minimise costs. Alternatively, it is possible that content servers 402, 403 are present in locations which have lower costs.

Figure 9:
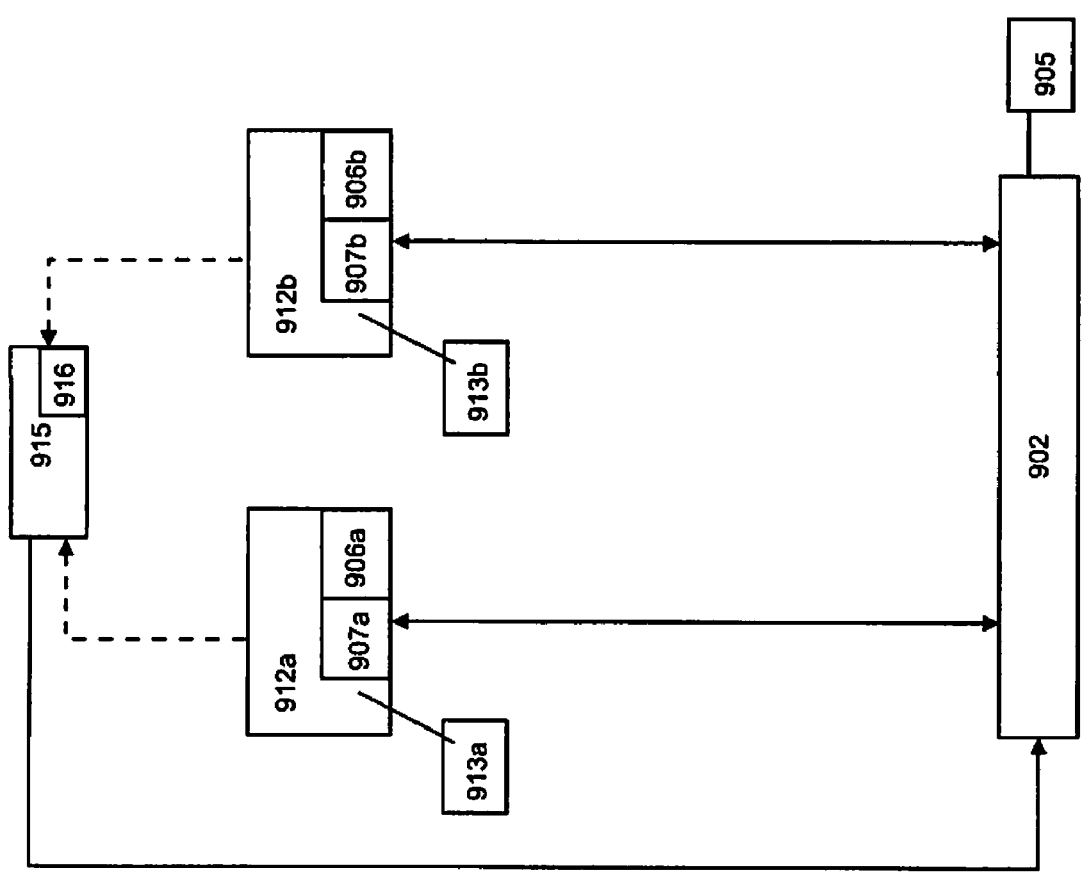
FIG. 9 shows an overview of a network for the delivery of digital data.

This can be illustrated in more detail with respect to FIG. 9 which shows an aspect of the present invention of a network 900 for the delivery of digital data to an end user 902 from a first cache 912a and a second cache 912b. The end user 902 is connected by at least two different network paths to the first cache 912a and the second cache 912b respectively. The first cache 912a and the second cache 912b each supply the portions of the digital data at a given parameter to the end user 902. Both the first cache 912a and the second cache 912b contain substantially identical copies of the digital data. In one aspect of the invention, this given parameter is the rate of delivery of the digital data but the given parameter might also indicate the cost of delivery of the digital data or it could be another parameter. A specification 905 comprises a range of values for the given parameter. For example the specification 905 includes, but is not limited to, a contracted, minimal bandwidth for the delivery of the digital data to the end user 902 and the cost of the digital data. The contracted, minimal bandwidth is generally the result of negotiations between the operators of the network 900 and content providers of the digital data as will be explained later. The content providers have their content, for example the digital data, distributed by the operators of the network 900 at the contracted bandwidth as the content provider is in turn bound by a contract to the end user 902 to deliver the digital data at the contracted bandwidth. The contracted bandwidth can be relevant if the end user 902 paid the content provider to receive the digital data in form of a video, for example, and hence expects to enjoy smooth streaming of the video across the network 900 without jamming and interruptions.

It should be noted that ownership of the first cache 912a and the second cache 912b are likely to be different and also the network path between the first cache 912a and/or the second cache 912b and the end user 902 may be owned by different entities. There are contractual arrangements between the owners of the first cache 912a and the second cache 912b as well as the suppliers of the network paths and the ISPs to which the end user 902 is connected to allow the use of the network paths between the first cache 912a and/or the second cache 912b and the end user 902.

Each ones of the first cache 912a and the second cache 912b have a configuration 913a and 913b which indicates a target rate of delivery of the digital data. The target rate of delivery is the rate of delivery with which each one of either the first cache 912a or the second cache 912b is capable of delivering the portions of the digital data to the end user 902. In general—but not always—the first cache 912a and the second cache 912b have different configurations 913a and 913b.

The network further includes a tracker 915. The tracker 915 provides to the end user 902 a list 916 of the first cache 912a and the second cache 912b as well as other caches and peers in the network 900 which can supply portions of the digital data. For example, the list may provide references such as URLs pointing to the first cache 912a and second cache 912b.

The end user 902 will typically connect to all of the sources of data which are given in the list 916. Thus the end user 902 will connect in this example to both the first cache 912a and the second cache 912b as well as to any peers 102 which can supply relevant portions of the digital data.

The network 900 also includes a first monitoring device 906a at the first cache 912a and a second monitoring device 906b at the second cache 912b. The first monitoring device 906a monitors the delivery of the portions of the digital object from the first cache 912a to the end user 902 as discussed above. Similarly the first cache 912a includes a first adjusting device 907a for adjusting the configuration of the first cache 912a. The second monitoring device 906b and a second adjusting device 907b perform similar functions for the second cache 912b. The first adjusting device 907a and the second adjusting device 907b adjust on the basis of the delivery monitored by the first monitoring device 906a and the second monitoring device 906b whether the speed of receipt of the digital data received by the end user 902 matches the specification 905. The adjustment by the first adjusting device 907a and the second adjusting device 907b is done in a manner such as to ensure that a combined configuration, i.e. the combined speed of delivery of the digital data from the first cache 912a and the second cache 912b as well as any peers, matches the specification 905. For example, if the configuration of one of the selected ones of the first cache 912a and the second cache 912b is 0.5 MB/s and the other one is 0.4 MB/s then the combined configuration would amount to 0.9 MB/s. Therefore, one can increase the combined configuration to 1.0 MB/s by increasing the 0.4 MB/s configuration by 0.1 MB/s to 0.5 MB/s. According to one aspect of the invention the selected ones of the first cache 912a and the second cache 912b receive "have messages" from the end user 902 about what portions of the digital data the end user 902 has received from which ones of the selected ones of the first cache 912a and the second cache 912b. The results of the "have messages" indicate the speed of receipt of the digital object at the end user 902.

According to one aspect of the invention the selected ones of the first cache 912a and the second cache 912b receive "have messages" from the end user 902 about what portions of the digital data the end user 902 has received from which ones of the selected ones of the first cache 912a and the second cache 912b. The results of the "have messages" indicate the speed of receipt of the digital object at the end user 902.

The first cache 912a and the second cache 912b operate substantially independently from each other and increase or decrease their configuration 913 independently of each other. Thus an expensive one of the first cache 912a or the second cache 912b can reduce the delivery of the digital data if the expensive one detects that sufficient digital data has been being supplied to the end user 902 from other sources.

The caches 912 in the network 900 thus dynamically adjust their delivery of the digital data to the end use 902 to ensure that at substantially all times during the download the digital data is delivered to the end user 902 at least at the contracted bandwidth and for the least possible cost.

Figure 13:
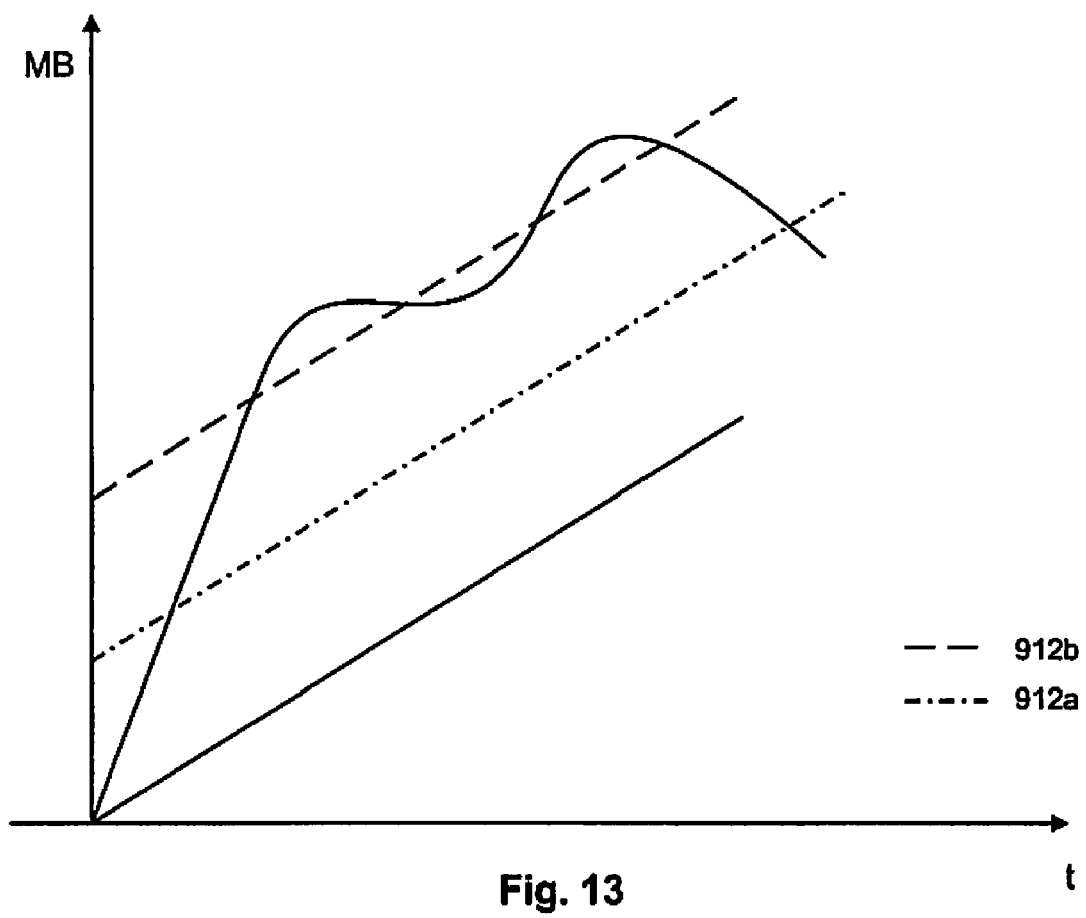
FIG. 13 shows the target speed of delivery at which the data source aims to deliver the digital data.

FIG. 13 shows a scenario in the network 900 for the delivery of digital data to the end user 902.

The first cache 912a and the second cache 912b each has a target profile stating how many bytes of the digital data should have been received at various points during the download as is shown in FIG. 13. The Y-axes shows the number of bytes delivered and the X-axes the time. Obviously at time zero neither of the first cache 912a nor the second cache 912b can have delivered anything at all, but both of the first cache 912a and the second cache 912b have a target to reach. The line for cache 912a is substantially higher than the line for cache 912b because its cost of delivery for cache 912a is less than the cost of delivery for cache 912b. The target rate of receipt of the digital object at the end user 902 is shown in the lower continuous line.

The winding curve on the graph shows the actual receipt of the digital data by the end user 902. In the first portion of the graph both the first cache 912a and the second cache 912b contribute portions of the digital object. Once the curve passes the delivery rate for the first cache 912a there is no need for the first cache 912a to delivery any more portions to the end user 902 as the end user 902 is being adequately supplied from the less expensive cache 912b. Thus the first cache 912a no longer supplies portions of the digital data to the end user 902—the portions of the digital data are supplied solely from the less expensive second cache 912b and any peers 102. Similarly once the curve goes above the line for the second cache 912b then the second cache 912b no longer needs to supply portions of the digital data as the peers 102 in the network 900 supply the portions of the digital data at an adequate delivery rate. This continues until the curve drops below the required rate at which point the second cache 912b (and if necessary the first cache 912a) can switch in again.

If the digital data is not required immediately, then it is possible for neither of the first cache 912a nor the second cache 912b to initially supply portions of the digital data. The end user 902 waits to see whether the peers 102 will supply adequate data.

In one example of the invention, the target rate for the receipt of the digital data is initially high whilst a video buffer is being filled. Once the video buffer is filled, then the target rate drops.

The profile for the first cache 912a or the second cache 912b does not need to be a straight line and the intercept (the point at which the line crosses the Y axis) does not have to be positive. A range of curves might be used for long downloads where it is desirable for the download to complete using only peer sources if possible. Such curves might lie on the X axis until halfway through the expected delivery time.

Figure 10:
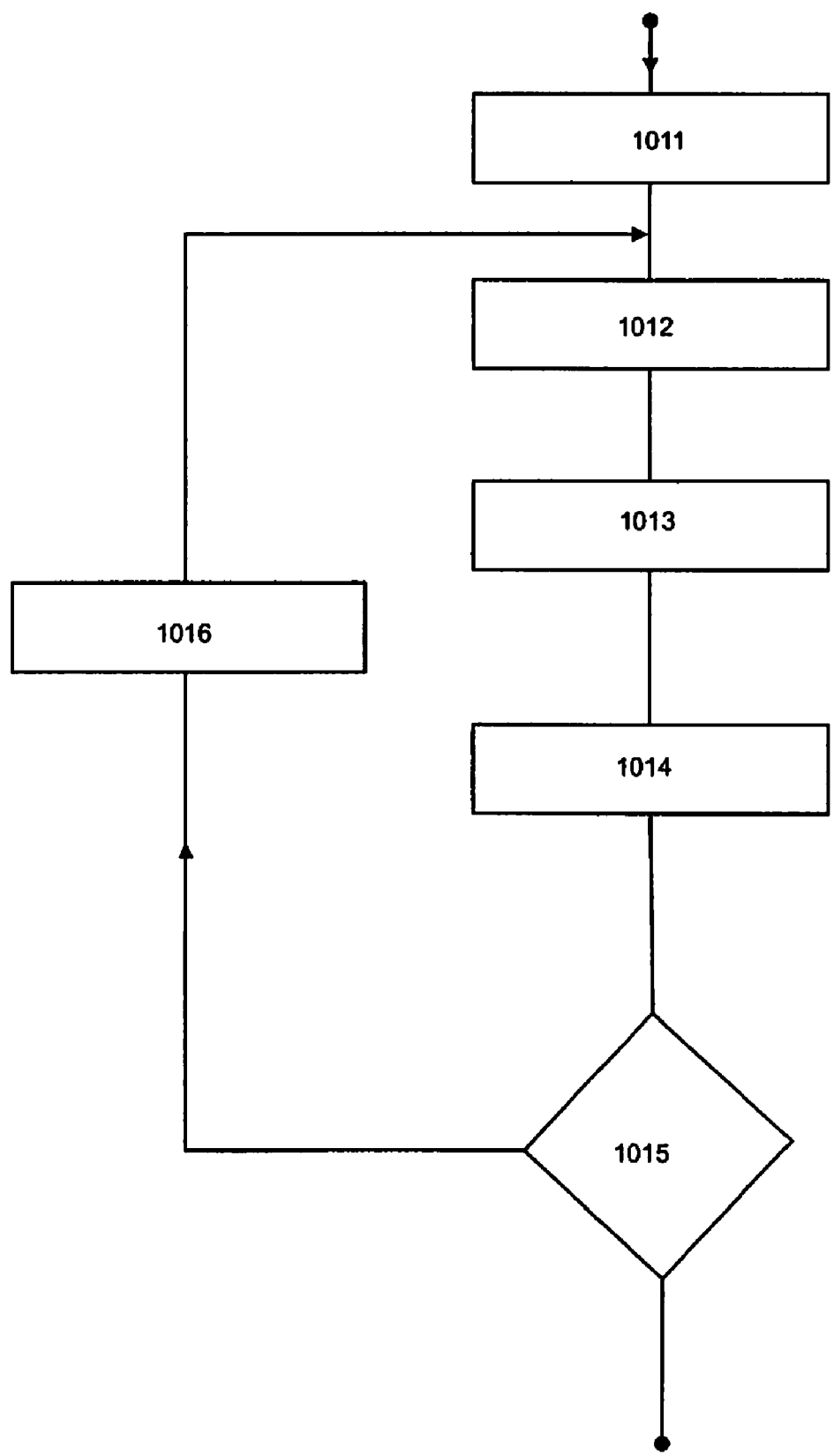
FIG. 10 shows a flow chart for a method for the delivery of digital data.

The method of the invention will now be explained by means of the flow chart as depicted in FIG. 10.

In step 1011 the list of the first cache 912a and the second cache 912b and some of the peers 102 which can supply the digital data is received from the tracker 915.

In step 1012 the end user 902 connects to the peers 102, the first cache 912a and the second cache 912b to receive the portions of the digital data.

At step 1013 at least one of the portions of the digital data from the connected ones of the first cache 912a or the second cache 912b or the peers connected in step 1012 is delivered to the end user 902.

At step 1014 messages are sent from the end user 902 to the connected ones of the first cache 912a and the second cache 912b indicating which portions of the digital data the end user 902 has received. This is compared in step 1015 with the specification 905 and at step 1016 the configuration 913a or 913b of the selected ones of the first cache 912a and the second cache 912b are adjusted if necessary. This adjustment is done in a manner such that a combined configuration matches the specification 905. The combined configuration is derived from the configuration 913a and 913b of each of the selected ones of the first cache 912a and the second cache 912b as explained above.

The invention can be used in a network 900 and method for allocating bandwidth for the delivery of digital data. In one pricing model for the delivery of digital data from a content provider, the content provider contracts with the operator of the content distribution network to distribute the digital data at a particular price. It is therefore in the interest of the CDN operator to distribute the digital data at the cheapest price. As a result, the CDN operator is interested in finding the cheapest servers (e.g. the first cache 912a or the second cache 912b) or server farms from which the digital data is provided. As long as the requirements for delivery speed are met at the end user 902, it is immaterial whether the portions are provided by the content distributions servers (e.g. first cache 912a or second cache 912b) or whether the portions are provided by peers (not shown) in the network 900. The CDN operator can therefore switch in faster servers in order to meet the contracted delivery speeds.

Operators of the content (e.g. the first cache 912a or the second cache 912b) servers are interested in optimising the use of their caches. As discussed above, some ISPs have substantial incoming data but little outgoing data but have infrastructure for a symmetrical downloading and uploading of digital data. As a result uploading channels on the ISP network are underutilised. In order to increase utilisation, the ISP can offer bandwidth on the underutilised uploading channels to a CDN operator. The price of the offered bandwidth can vary depending on the current amount of data being uploaded into the Internet by the ISP's own subscribers. During the day in which the ISP customers are more active, the uploading channels are used more heavily by the ISP customers. The ISP does not have as much capacity for uploading digital data for supply to end users who are not ISP customers. Thus the price of the bandwidth can be higher than that during sleeping hours in the time zone in which the ISP is operating. During night time hours, for example, little traffic is being uploaded and the price of the bandwidth can be diminished to encourage the CDN operator to use the ISP for the distribution of the digital data. The ISP has the infrastructure in place which is underutilised—the only incremental costs will be the invoicing structures.

The content provider does not need to know from which cache (e.g. the first cache 912*a* or the second cache 912*b*) its content is being distributed. It is immaterial to its business model. Only the CDN operator needs to negotiate the business arrangements with ISPs and owners of server farms to obtain the best possible price.

In an ideal arrangement more than one ISP can offer bandwidth from the cache to the end user to the CDN operator at differing prices dependent on the current utilisation of the uploading channels by the ISP subscribers. Thus the CDN operator can chose to select the most economical and/or the fastest delivery bandwidth offered by the more than one ISP. This allows the development of a spot market in which the ISP offers bandwidth capacity from the cache at a guaranteed minimum delivery speed for a particular price. The CDN operator can chose to accept this offer or at least purchase an option on the offer—or to decline the offer. Once the offer is accepted, it is, within a very short time frame, allocated to the CDN operator.

Figure 11:
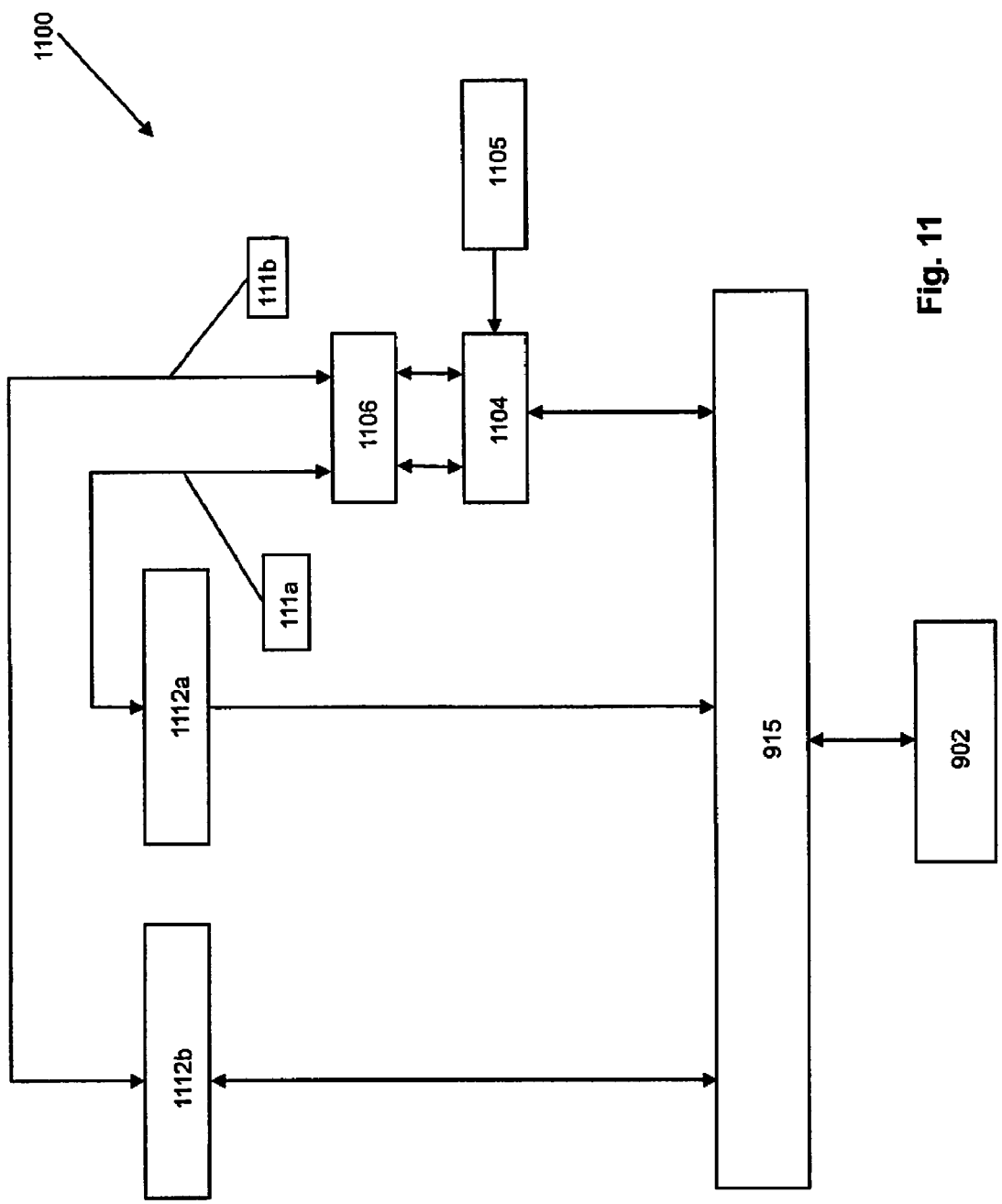
FIG. 11 shows an overview of a network for the allocation of bandwidth for the delivery of digital data.

FIG. 11 shows an example of this aspect of the invention. The network 1100 includes a receiving device 1106 which receives respectively, a first proposal 1111*a* and a second proposal 1111*b* from the first cache 1112*a* (equivalent to 912*a* in FIG. 9 and 402 in FIG. 4) and the second cache 1112*b* (equivalent to 912*b* in FIG. 9 and 403 in FIG. 4). The first cache 1112*a* and the second cache 1112*b* offer bandwidth to the CDN operator at a parameter for the delivery of the digital data by sending the first proposal 1111*a* and the second proposal 1111*b* to an offer selection device 1104. The proposal selection device 1104 selects the one of the proposals 1111*a*, 1111*b* from the first cache 1112*a* or the second cache 1112*b* which corresponds to a specification 1105 for the delivery of the digital data. It is contemplated that the specification 1105 comprises a contracted minimal bandwidth for the delivery of the digital data and/or a contracted price for the delivery of the digital data as negotiated between the content provider and the CDN operator for delivering the digital data to the end user 1102. However, the specifications can include other factors.

The proposal selection device 1104 will select from among the first proposal 1111*a* and the second proposal 1111*b* corresponding to the specifications 1105 that proposal (or alternatively those proposals) which have a preferred value for the parameter, e.g. the cheapest price for the cost of the bandwidth or the supply of the digital data.

After the proposal selection device 1104 has made the selections, the information of the available ones of the first cache 1112*a* and the second cache 1112*b* available for the delivery of the digital data is supplied to the tracker 915 so that the tracker 915 can supply the list to the end users 902 as explained above.

In one aspect embodiment of the present invention a difference between the different proposals is based on a different cost model for the network path and/or the operation of the first cache 1112*a* and the second cache 1112*b*. One possibility for such cost model contemplated by the present invention is the availability of uploading capacities on the network paths at the first cache 1112*a* or the second cache 1112*b* as discussed above.

One aspect of the present invention includes a spot market for bandwidth trading. In this aspect of the invention, the proposal selection device 1104 receives multiple proposals, e.g. the first proposal 1111*a* and the second proposal 1111*b*, from multiple suppliers of the digital data (which may be the first cache 1112*a* and the second cache 1112*b* or could be other storage devices). The proposal selection device 1104 monitors the proposals continually—or at least on a regular basis—and selects the best proposals available. The tracker 1103 then supplies to the end user 902 the ones of the multiple suppliers offering the best available conditions (e.g. price) for the delivery of the digital data. This selection can happen substantially in real-time or over the course of a longer time frame.

Note that it is not necessary that the proposal 1111*a* or 1111*b* to be received from the caches 1112*a* and 1112*b*. They may be received from another device in the same network as the network that the cache 1112*a* or 1112*b* is installed in.

Figure 12:
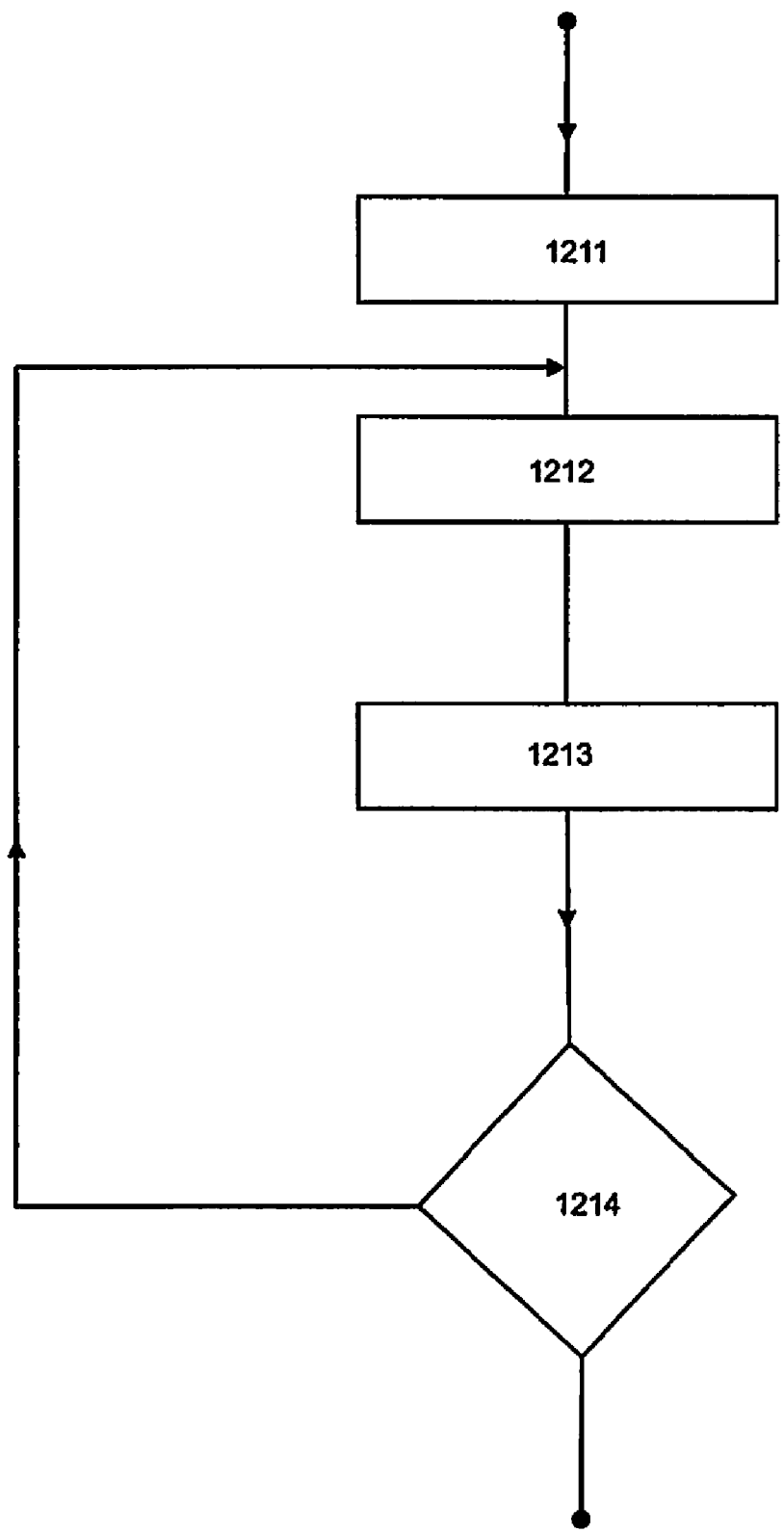
FIG. 12 shows a flow chart for the allocation of bandwidth for the delivery of digital data.

This aspect of the invention will be further explained by means of the flow chart as shown in FIG. 12. In step 1211 the proposals 1111*a* and 1111*b* are received from the multiple suppliers of the digital data connected in the network 900 and offering the bandwidth along a network path from the end user to the first cache 1112*a* and/or the second cache 1112*b* at the given parameter for the delivery of the digital data. The given parameter comprises, in this aspect of the invention, a price of the bandwidth. At least one of the received proposals 1111*a* or 1111*b* corresponding to specifications for the delivery of the digital data is then selected in step 1212. The specification will generally comprise a contracted minimal bandwidth for the delivery of the digital data and/or a contracted price for the delivery of the digital data.

Finally in step in 1213 the tracker 915 will be supplied with the list 916 of the first cache 1112*a* and/or the second cache 1112*b* which can supply the digital data to the end users 902.

In a further step 1214, further proposals are requested and if these are forthcoming, the selection process is continued. In an ideal market more than one CDN operator will be seeking bandwidth from more than one supplier of bandwidth and/or server farms. In addition other distributors of data requiring bandwidth will also be active in the marketplace.

In one aspect of the invention the parameters can be changed by the controller of the content delivery network and application programming interfaces are available to do this.

The invention has been described in terms of an illustrative example. The person skilled in the art will recognize that the invention can be practiced with modification within the spirit and scope of the attached claims. At least, it should be noted that the invention is not limited to the detailed description of the invention and/or of the examples of the invention. It is clear for the person skilled in the art that the invention can be realized at least partially in hardware and/or software and can be transferred to several physical devices or products. The invention can be transferred to at least one computer program product. Further, the invention may be realized with several devices.

The invention claimed is:

1. A method for the delivery of digital data to an end user from a network comprising at least two different data sources, each of the at least two different data sources having at least one parameter and whereby the at least two data sources have substantially identical copies of the digital data comprising portions and are connected to the end user, the method comprising:

receiving a list of a subset of the at least two data sources;

selecting based on the list one or more of the subset of at least two data sources;

delivering at least a portion of the digital data from the selected ones of the at least two data sources to the end user;

monitoring the at least one parameter for the delivery of the digital data to the end user; and adjusting a configuration of the selected ones of the at least two data sources based on of the monitored at least one parameter such that a combined configuration of the configurations of the selected ones of the at least two data sources matches a specification;

wherein the at least one parameter comprises a cost of delivery of the digital data to the end user.

2. The method of claim 1, further comprising selecting a further one of the at least two data sources in case the combined configuration does not match the specification, such that the configuration of the further one of the data sources selected matches the specification.

3. The method of claim 1, further comprising receiving messages from the end user related to the receipt of the portions of the digital data by the end user.

4. The method of claim 3, wherein adjusting the configuration of the selected ones of the at least two data sources is further based on the messages.

5. The method of claim 1, wherein the configuration of any one of the selected ones of the at least two data sources comprises a target rate of delivery of the digital data to the end user from that one of the selected ones of the at least two data sources.

6. The method of claim 5, wherein the selected ones of the at least two data sources matches the specification if the rate of delivery exceeds or is equal to a contracted minimal bandwidth.

7. The method of claim 6, wherein the at least two data sources comprise at least a first data source and a second data source, the first data source having a lower cost of delivery than the second data source, and wherein the adjusting step comprises increasing utilization of the second data source relative to the first data source if the rate of delivery is less than the contracted minimal bandwidth.

8. The method of claim 6, wherein the at least two data sources comprise at least a first data source and a second data source, the first data source having a lower cost of delivery than the second data source, and wherein the adjusting step comprises decreasing utilization of the second data source relative to the first data source if the rate of delivery exceeds the contracted minimal bandwidth.

9. The method of claim 1, wherein the at least one parameter further comprises a rate of delivery of the digital data to the end user.

10. The method of claim 1, wherein the selected ones of the at least two data sources matches the specification if the cost of delivery represents a least cost.

11. An apparatus for the delivery of digital data to an end user from a network, the digital data comprising a plurality of portions, the apparatus comprising:

at least two data sources supplying portions of the digital data at at least one parameter to the end user;

a tracker providing a list of a subset of the at least two data sources;

a selection device for selecting based on the list one or more of the at least two data sources to supply at least some of the portions of the digital data to the end user, such that a configuration of the selected ones of the at least two data sources matches a specification for the delivery of the digital data to the end user;

a monitoring device for monitoring the at least one parameter for the delivery of the digital data to the end user;

an adjusting device for adjusting based on of the monitored at least one parameter a configuration of at least one of the selected ones of the at least two data sources such that a combined configuration of the configurations of the selected ones of the at least two data sources matches a specification;

wherein the at least one parameter comprises a cost of delivery of the digital data to the end user.

12. The apparatus according to claim 11, wherein the selection device further selects further ones of the at least two data sources in case the combined configuration does not match the specification.

13. The apparatus according to claim 11, further comprising a receiving device for receiving messages from the end user related to receipt of portions of the digital data by the end user.

14. The apparatus according to claim 13, wherein the adjusting device further adjusts the configuration of the selected ones of the at least two data sources based on the messages.

15. The apparatus according to claim 11, wherein the monitoring device is located at the at least two data sources.

16. The apparatus according to claim 11, wherein the at least one parameter further comprises a rate of delivery of the digital data to the end user.

17. The apparatus according to claim 16, wherein the combined configuration of the selected ones of the at least two data sources matches the specification if the rate of delivery exceeds or is equal to a contracted minimal bandwidth.

18. The apparatus according to claim 11, wherein the configuration of any one of the selected ones of the at least two data sources comprises a target rate of delivery of the digital data to the end user from the one of the selected ones of the at least two data sources.

19. The apparatus according to claim 11, wherein the combined configuration of the selected ones of the at least two data sources matches the specification if the cost of delivery represents a least cost.

20. The apparatus according to claim 11, wherein the at least two data sources comprise multiple types of data sources.

21. The apparatus according to claim 11, wherein the at least two data sources comprise at least two caches.

22. The apparatus according to claim 11, wherein the network is a content delivery network (CDN).

23. The apparatus according to claim 11, wherein the network is a peer-to-peer network and the at least two data sources comprise at least one peer connected to a network path.

* * * * *